United States Patent
Armstrong et al.

[11] Patent Number: 5,901,432
[45] Date of Patent: May 11, 1999

[54] METHOD FOR MAKING A THIN FILM INDUCTIVE WRITE HEAD HAVING A PEDESTAL POLE TIP AND AN ELECTROPLATED GAP

[75] Inventors: Michael Armstrong, Danville; David Heim, Redwood City; Richard Hsiao, San Jose; Neil Leslie Robertson, Palo Alto; Hugo Alberto Emilio Santini, San Jose, all of Calif.

[73] Assignee: International Business Machines Corporation, Armonk, N.Y.

[21] Appl. No.: 08/997,957

[22] Filed: Dec. 24, 1997

[51] Int. Cl.⁶ .................................................. G11B 5/127
[52] U.S. Cl. ................... 29/603.14; 29/603.15; 29/603.18; 216/22; 205/122
[58] Field of Search ........................ 29/603.13–603.18; 360/113; 216/22, 27, 66, 67; 250/492.3, 492.21; 205/122

[56] References Cited

U.S. PATENT DOCUMENTS

| | | | |
|---|---|---|---|
| 5,285,340 | 2/1994 | Ju et al. | 360/119 |
| 5,438,747 | 8/1995 | Krounbi et al. | 29/603 |

*Primary Examiner*—Carl E. Hall
*Assistant Examiner*—Davide Caputo
*Attorney, Agent, or Firm*—Merchant, Gould, Smith, Edell, Welter & Schmidt, P.A.

[57] ABSTRACT

A method for making a merged thin film read/write head, where the first pole piece includes a pedestal or pole tip portion that extends up from the first pole piece layer, uses electroplating to form the gap so that the gap layer does not have to be removed later. After the first pole piece is deposited, the coil insulation structure is built over the first pole piece. Afterwards an electrically conductive seed layer of the same ferromagnetic material as the first pole piece is formed over the wafer to provide an electrically conductive path for subsequent electroplating. After the seed layer deposition, a photoresist pattern is then formed to define the shape of the second pole piece. Nonmagnetic nickel-phosphorous is then electroplated onto the seed layer in the region not covered by the photoresist pattern to form the gap layer. The second ferromagnetic layer is then electroplated onto the gap layer to define the shape of the second pole piece. The thickness of the second pole piece layer is deliberately made thicker than the desired final thickness because the second pole piece layer is used as a mask for subsequent ion beam milling to form the notched pole tip element of the first pole piece. The photoresist is removed and ion beam milling performed to remove the seed layer and a portion of the first pole piece layer to define the pedestal pole tip element of the first pole piece. The ion beam milling does not have to remove the gap layer because the electroplated gap has been defined by the photoresist pattern to have the desired trackwidth.

8 Claims, 8 Drawing Sheets

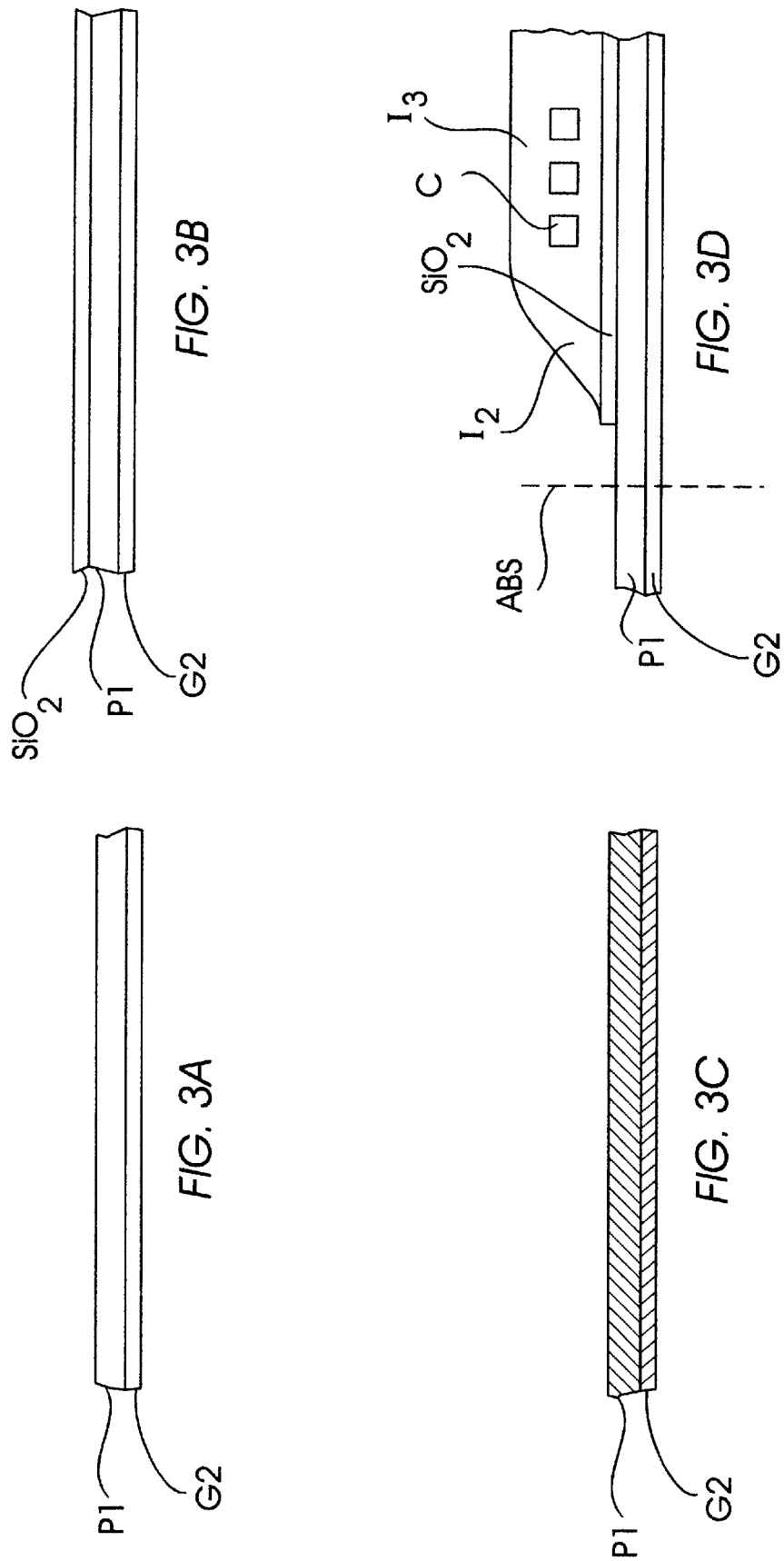

METHOD FOR MAKING A THIN FILM INDUCTIVE WRITE HEAD HAVING A PEDESTAL POLE TIP AND AN ELECTROPLATED GAP

TECHNICAL FIELD

This invention relates generally to a thin film inductive write head of the type formed by thin film deposition and lithographic patterning techniques on the trailing end of an air-bearing slider used in a magnetic recording disk drive. More particularly, the invention relates to a method for making a thin film inductive write head of the type where the pole tip on the first pole piece is notched or shaped as a pedestal.

BACKGROUND OF THE INVENTION

In a magnetic recording disk drive, data is written by thin film magnetic transducers called "heads", which are supported over a surface of the disk while it is rotated at a high speed. The heads are supported by a thin cushion of air (an "air bearing") produced by the disk's high rotational speed.

A prior art "merged" magnetoresistive (MR) read/inductive write head is shown in the side sectional view of FIG. 1 and the partial end view, as seen from the disk, of FIG. 2. The term "merged" read/write head means that a magnetoresistive read element (or head) is located between first and second magnetic shields and an inductive write element (or head) has first and second pole tips spaced by a nonmagnetic gap, where the second magnetic shield for the magnetoresistive read element also serves as the first pole tip for the inductive write element. The thin film inductive write head includes bottom and top pole pieces P1 and P2, respectively, that are formed from thin films ("layers") of magnetic material. The pole pieces have a pole tip height dimension commonly called "throat height". In a finished write head, throat height is measured between an air-bearing surface ("ABS"), formed by polishing the tips of the pole pieces, and a zero throat height level ("zero throat level"), where the bottom pole piece P1 and the top pole piece P2 converge at the magnetic recording gap G. A thin film magnetic write head also includes a "pole tip region" which is located between the ABS and the zero throat level, and a "back region" which extends back from the zero throat level to and including a back gap BG. Each pole piece has a pole tip portion in the pole tip region and a back portion in the back region. The pole pieces are connected together at the back gap BG. The pole tips are extensions of the bottom and top pole pieces P1 and P2 of the write head. Each of the pole pieces P1 and P2 transitions to a pole tip in the pole tip region. The pole tips are separated by a gap G, which is a thin layer of insulation material, typically alumina ($Al_2O_3$). The pole tip of the top pole piece P2 is the last element to induce flux into the magnetic layer on the disk; therefore, its width is more important than the width of the pole tip on the bottom pole piece P1. However, it is important for the pole tips to have the same width to minimize stray flux leakage around the gap.

A merged MR head, such as shown in FIGS. 1 and 2, employs an MR read element and an inductive write element in combination. This is accomplished by using the top shield S2 of the MR element as the bottom pole P1 of the write element. A merged MR head has a high capability for either reading or writing. The merged MR head saves processing steps over constructing separate read and write heads because the second shield layer S2 of the MR read head also serves as the bottom pole P1 for the write head, thereby eliminating a fabrication step.

However, merged MR head structures generate significantly large side-fringing fields during recording. These fields are caused by flux leakage from the top pole P2 to the parts of the bottom pole P1 beyond the region defined by P2. The side-fringing fields limit the minimum trackwidth achievable, and therefore limit the upper reach of track density. Consequently, when a track written by the write element of a merged MR head is read by the MR element, the "off-tracK" performance of the MR element is poor. That is, when the MR element is moved laterally from the center of a track being read, it cannot move far before interference from the fields of the adjacent track begins to interfere with the fields of the track being read.

One solution to the side-fringing problem of the merged MR head is to construct a narrow "pedestal" pole tip portion PT1b on top of the second shield layer S2, as shown in FIG. 2, with the P1/S2 layer then serving as a wider bottom pole tip element PT1a. Both of these pole tip elements PT1b and PT1a form the pole tip portion of the bottom pole P1, with the pole tip element PT1b forming a pedestal on the pole tip element PT1a. The sidewalls of the bottom and top pole tips PT1b and PT2 are substantially vertically aligned and constrained to substantially equal widths.

The conventional process for fabricating the pole pieces and gap of the merged MR head involves sputter deposition and lithographic patterning. The pedestal PT1b pole tip element is formed by ion beam milling through the top and bottom pole pieces and gap layer G, using P2 as a mask, to remove the gap layer G and a portion of layer P1 in the region not beneath P2. It is this ion beam milling with P2 as a mask that causes the sidewalls of the bottom and top pole tips PT1b and PT2 to be substantially vertically aligned. Because the PT1b pole tip element is formed by ion beam milling of the gap layer G and a portion of the P1 layer not beneath the P2 layer, this type of P1 pole tip is also called a "notched" pole tip. However, because of shadowing of the ion beam caused by the top pole tip PT2 during the ion beam milling process, there is some outward taper to the bottom pole tip PT1b. In addition, because the ion beam milling rate of the material of gap layer G is slower than the ion beam milling rate of the Ni—Fe material of P1, and because P2 is to serve as the mask, a much thicker layer of P2 is required to compensate for the loss of P2 material during the ion beam milling.

What is needed is process for forming a thin film inductive write head, and particularly a merged magnetoresistive read/inductive write head, that does not require a substantially thicker P2 layer.

SUMMARY OF THE INVENTION

The present invention is an improved method for making a merged thin film read/write head where a common layer serves as both a magnetic shield for the MR read element and the first pole piece for the inductive write element, and where the first pole piece thus includes a pedestal pole tip portion that extends up from the first pole piece layer. After the first pole piece is deposited, the coil insulation structure is built over the first pole piece. Afterwards an electrically conductive seed layer of the same ferromagnetic material as the first pole piece is formed over the wafer to provide an electrically conductive path for subsequent electroplating. After the seed layer deposition, a photoresist pattern is then formed to define the shape of the second pole piece. Nonmagnetic nickel-phosphorous is then electroplated onto the seed layer in the region not covered by the photoresist pattern to form the gap layer. The second ferromagnetic layer is then electroplated onto the gap layer to define the shape of the second pole piece. The thickness of the second pole piece layer is deliberately made thicker than the desired final thickness because the second pole piece layer is used as a mask for subsequent ion beam milling to form the notched pole tip element of the first pole piece. The photoresist is removed and ion beam milling performed to remove the seed layer and a portion of the first pole piece layer to define the notched pole tip element of the first pole piece. The ion beam milling does not have to remove the gap layer because the electroplated gap layer has been defined by the photoresist pattern to have the desired trackwidth. The seed layer is below the gap layer and thus becomes a part of the first pole piece. Therefore, the first pole piece layer will be notched by the ion beam milling to a depth equal to the thickness of the seed layer when the seed layer removal is complete. The second pole piece layer can be made substantially thinner and the ion beam milling process made significantly shorter than would otherwise be required.

In an alternative method, a third ferromagnetic layer of Ni—Fe is electroplated directly onto the seed layer in the regions not covered by the photoresist before the gap layer is electroplated to form an electroplated pedestal pole tip element for the first pole piece. In another alternative method the photoresist patterning process is done in two phases using a double exposure and development process, so that the pedestal pole tip element can be electroplated only in the pole tip region of the photoresist pattern, followed by electroplated of the remaining second pole piece after the gap layer is electroplated in the pole tip region.

For a fuller understanding of the nature and advantages of the present invention, reference should be made to the following detailed description taken together with the accompanying figures.

BRIEF DESCRIPTION OF THE DRAWING

FIGS. 3A–3K are sectional views of the merged magnetoresistive read/inductive write head with electroplated gap during steps in the process of the present invention for fabricating the head.

DETAILED DESCRIPTION OF THE INVENTION

Prior Art

Figure 1:
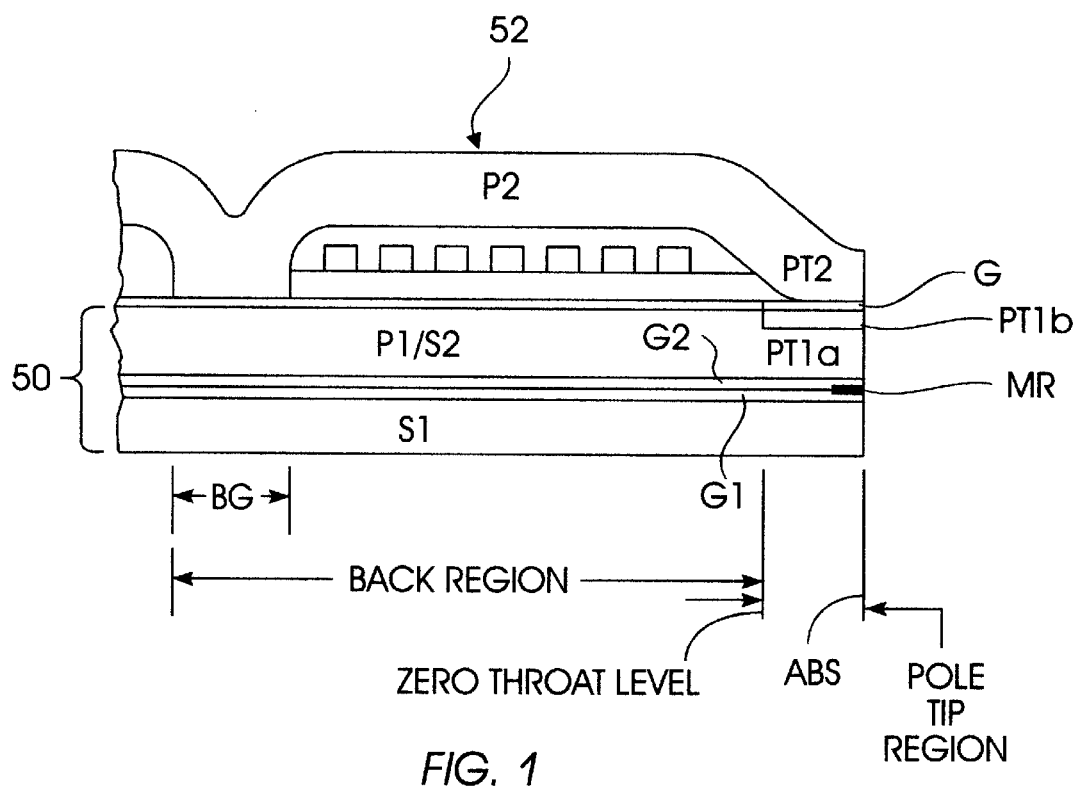
FIG. 1 is a side sectional view of a prior art merged magnetoresistive read/inductive write head.

FIG. 1 illustrates a portion of a merged MR read/inductive write head showing the MR read head 50 and the inductive write head 52. The merged head is mounted on the trailing end of a head carrier, such as an air-bearing slider.

As shown in FIG. 1, the read head 50 includes a magnetoresistive element MR which is sandwiched between first and second gap layers G1 and G2, the gap layers in turn being sandwiched between first and second shield layers S1 and S2. In a merged MR head, the second shield layer S2 of the read head 50 also serves as the bottom pole piece P1 for the write head 52.

As shown in FIG. 1, the write head 52 has a pole tip region which is located between the air-bearing surface (ABS) and a zero throat level and a yoke, or back region, which extends back from the zero throat level to and including a back gap. The write head 52 includes a bottom pole piece P1 and a top pole piece P2. The bottom pole piece P1 comprises the second shield layer S2 of the read head 50. Each pole piece P1 and P2 also has a back layer portion which is located in the back region, the back layer portions of the pole pieces being magnetically connected at the back gap (BG). The bottom pole piece P1 includes a pole tip structure which is located in the pole tip region between the ABS and the zero throat level. This pole tip structure includes a bottom pole tip element PT1a and a top pole tip element PT1b formed as a pedestal above P1. The top pole piece P2 includes a pole tip structure which is located in the pole tip region between the ABS and the zero throat level. This pole tip structure includes a top pole tip element PT2. The pole tip elements PT1a and PT1b are integrally formed from second shield S2 of the read head 50. A pole gap layer (G) is sandwiched between the pole tip elements PT1b and PT2. The desired thickness (gap length) of this layer depends on the desired linear density of the write head. Acceptable gap lengths range from approximately 0.1 $\mu$m to 0.7 $\mu$m. The gap layer G may extend to the back gap BG or, alternatively, may terminate at the zero throat level.

Figure 2:
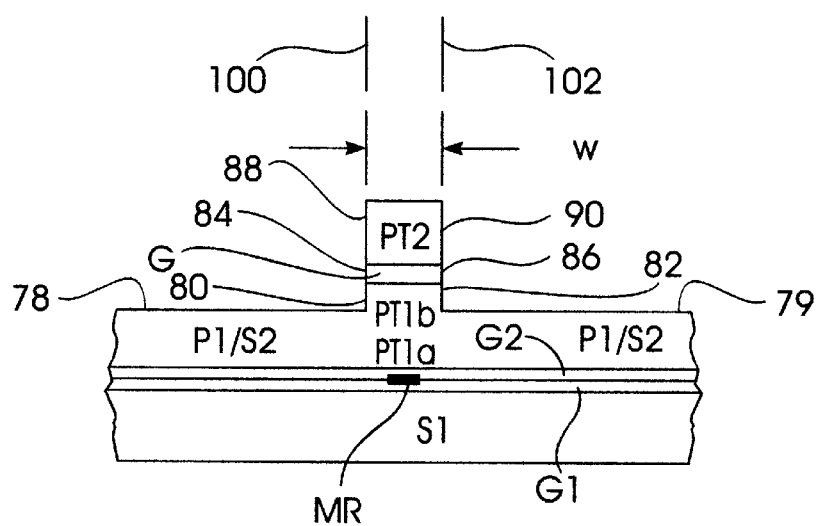
FIG. 2 is a partial end view, as seen from the disk, of the pole tip region of the prior art merged magnetoresistive read/inductive write head shown in FIG. 1.

The bottom pole piece P1 and its pole tip comprise the second shield layer S2 of the MR read head, as shown in FIGS. 1 and 2. One feature of a merged head is that a process step in depositing an extra magnetic layer is eliminated. However, the large width of the second shield layer S2 beyond the sides of the gap G, as illustrated in FIG. 2, causes flux to extend toward the second shield layer S2 beyond the width of the pole tip element PT2. This "side-fringing" flux causes sidewriting which can degrade off-track performance. This problem has been overcome by notching the second shield layer S2 at 78 and 79 on each side of the gap G so as to provide the second shield layer S2 with a pedestal which forms a pole tip element PT1b. Below the pedestal pole tip element PT1b is an area which can be referred to as a pole tip element PT1a. The pole tip elements PT1a and PT1b are forward extensions of the bottom pole piece P1, which comprises the second shield layer S2. The width of the second shield layer S2 is sufficient to effectively shield the MR element of the read head 50. This width can be in the order of 50 $\mu$m, in comparison to a width of approximately 1 $\mu$m for the width of the pole tip elements. The notching 78 and 79 of the second shield layer S2 provides the pedestal pole tip element PT1b with first and second vertical sidewalls 80 and 82. Similarly, the gap layer G has first and second vertical sidewalls 84 and 86. The pole tip element PT2 on top of the gap layer G has first and second vertical sidewalls 88 and 90. The first sidewalls 80, 84, and 88 of the pole tip elements PT1b, the gap G, and the pole tip elements PT2, respectively, lie contiguously in a first vertical plane 100; and the second vertical walls 82, 86, and 90 lie contiguously in a second vertical plane 102. As shown in FIG. 2, the vertical planes 100 and 102 are equally spaced from one another at the ABS to form the trackwidth w of the write head 52. The first and second vertical planes 100 and 102 are also perpendicular to the ABS. The first and second vertical planes 100 and 102 are preferably equally spaced all the way from the ABS to the zero throat level. However, they could diverge from the ABS if desired. The vertical alignments of the sidewalls of the pole tip elements in the first and second vertical planes 100 and 102 are important in combination with the pedestal pole tip PT1b to minimize sidewriting caused by the large lateral width of the second shield layer S2.

DESCRIPTION OF THE PREFERRED EMBODIMENTS

The present invention is an improved process for making merged heads of the type similar to the prior art heads shown in FIGS. 1 and 2, and will be explained with respect to FIGS. 3A–3K.

Referring first to FIG. 3A, a first ferromagnetic layer of material, typically Ni—Fe, is deposited onto a substrate, typically the G2 layer of the merged head, to form the first pole piece P1. The G2 and other layers of the merged head are formed on the surface of a wafer. The wafer is subsequently cut into individual sliders, with each slider having a merged head formed on it. The first pole piece P1 will be shared with the MR read head as the second shield S2. A layer of insulating material, preferably $SiO_2$ or alternatively $Al_2O_3$, is then deposited to a thickness of approximately 1500 Å over the wafer. The $SiO_2$ insulating layer acts as a protection layer from the subsequent coil and shield processing. The P1 layer with the $SiO_2$ insulating layer is shown in FIG. 3B. The conventional coil structure of coils C and insulation layers 12 and 13 is then patterned and formed over the $SiO_2$ layer, after which the $SiO_2$ layer is removed by wet etching or reactive ion etching from areas not beneath the coil structure. The resulting structure is shown in FIGS. 3C (the ABS sectional view) and FIG. 3D (the side sectional view through the center of the head structure).

Figure 3F:
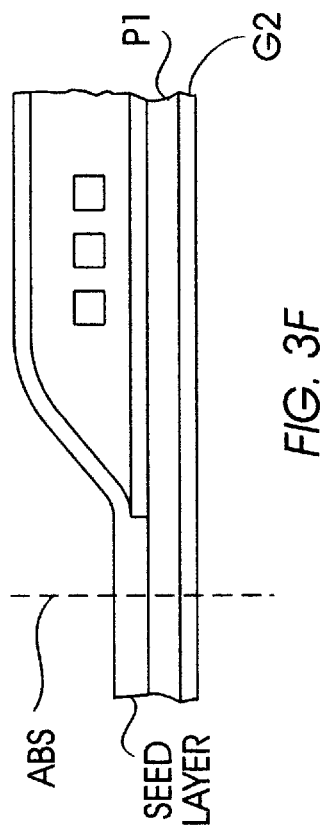
Figure 3E:
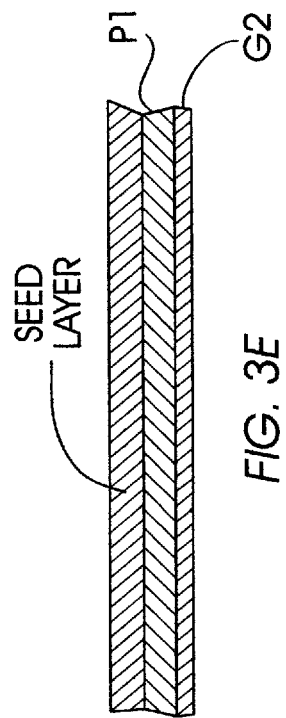

Next, as shown in FIGS. 3E–3F, an electrically conductive and magnetic "seed" layer is deposited by vacuum deposition over the entire coil structure and P1 layer. This seed layer is preferably a Ni—Fe alloy, such as the Ni—Fe also used for the P1 and P2 layers, deposited to a thickness of approximately 800 Å. The purpose of this seed layer is to provide an electrically conductive path for later electroplating of material onto the head structure.

Figure 3H:
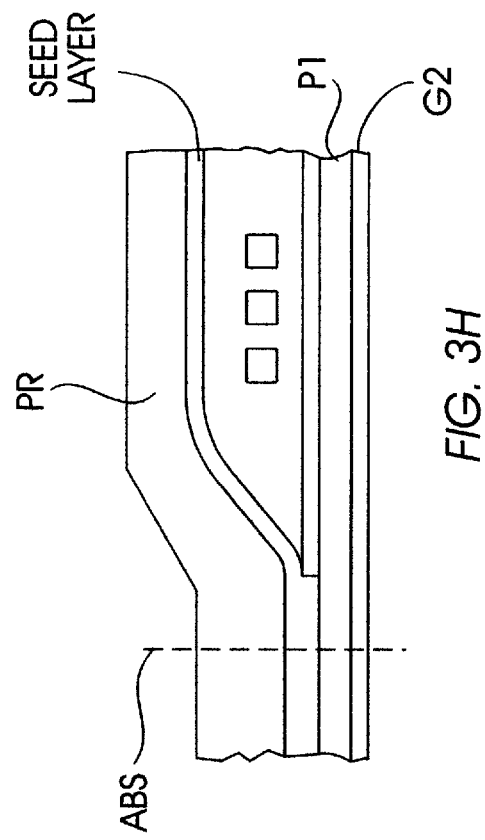
Figure 3G:
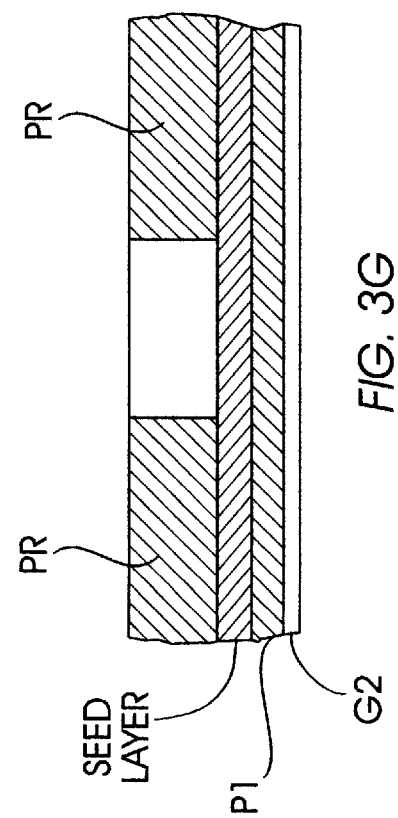

Before electroplating, a photolithographic process is performed to form a pattern for the gap and P2 layer which will be deposited into the regions not covered by the photoresist. As shown in FIGS. 3G–3H, a layer of photoresist PR is deposited and patterned on the seed layer to define a shape for the second pole piece P2 that will overlay the coil structure.

Figure 3J:
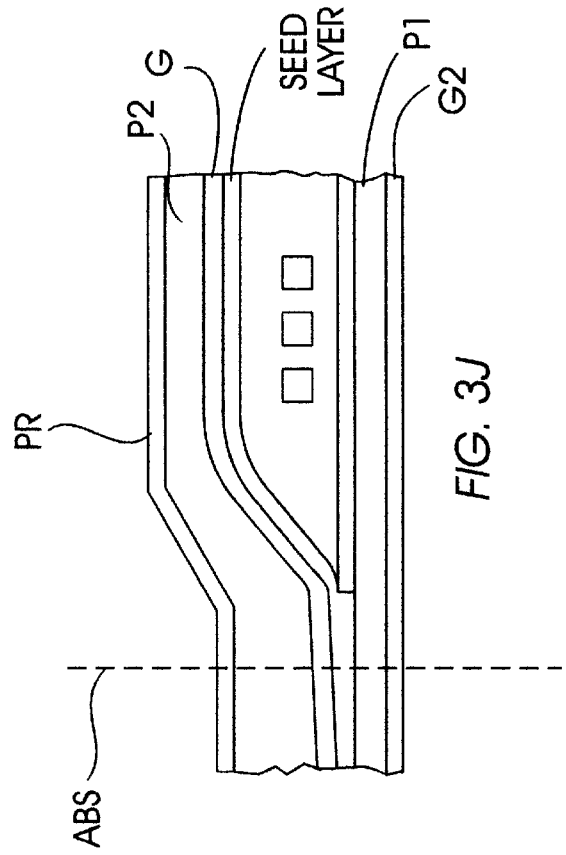
Figure 3I:
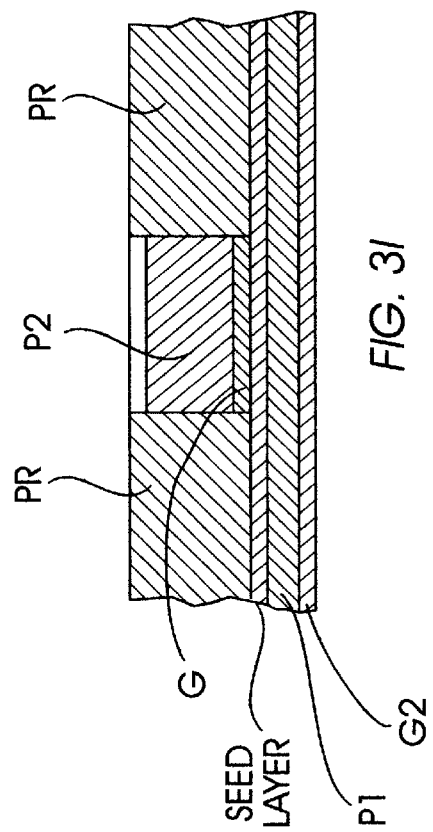

The first layer to be electroplated, using the Ni—Fe seed layer to provide the conductive path, is the gap layer G. A layer of electrically conductive, nonmagnetic NiP is electroplated into the region not covered by photoresist PR to serve as the gap layer G. The NiP is plated from a plating bath of 30 gm/l of $NiSO_4$—$6H_2O$, 10 gm/l $NaH_2PO_2$—$H_2O$, 10 gm/l $NaC_2H_3O_2$—$3H_2O$, and FC-95 brand surfactant, available from 3M Corporation, at a pH of 4 and a temperature of 35 degC. A square wave current source is applied with a frequency of 0.56 Hz, duty cycle of 0.44, and peak current of 2.5 mA/cm2. These plating conditions result in a controllable NiP plating rate of approximately 120 Å/min. The NiP gap layer is plated to a thickness of approximately 1500 Å. Following the plating of the gap layer, the second ferromagnetic layer to form the P2 pole piece, is plated over the gap layer into the regions not covered by the PR layer. The P2 layer is also preferably a Ni—Fe alloy. Because the P2 layer is to be used as the mask for subsequent ion beam milling to remove the seed layer and a portion of the P1 layer, the P2 layer is plated to a thickness greater than the desired final thickness of P2 in the finished head structure. The structure after electroplating of the gap and P2 layers is shown in FIGS. 3I–3J.

Figure 3K:
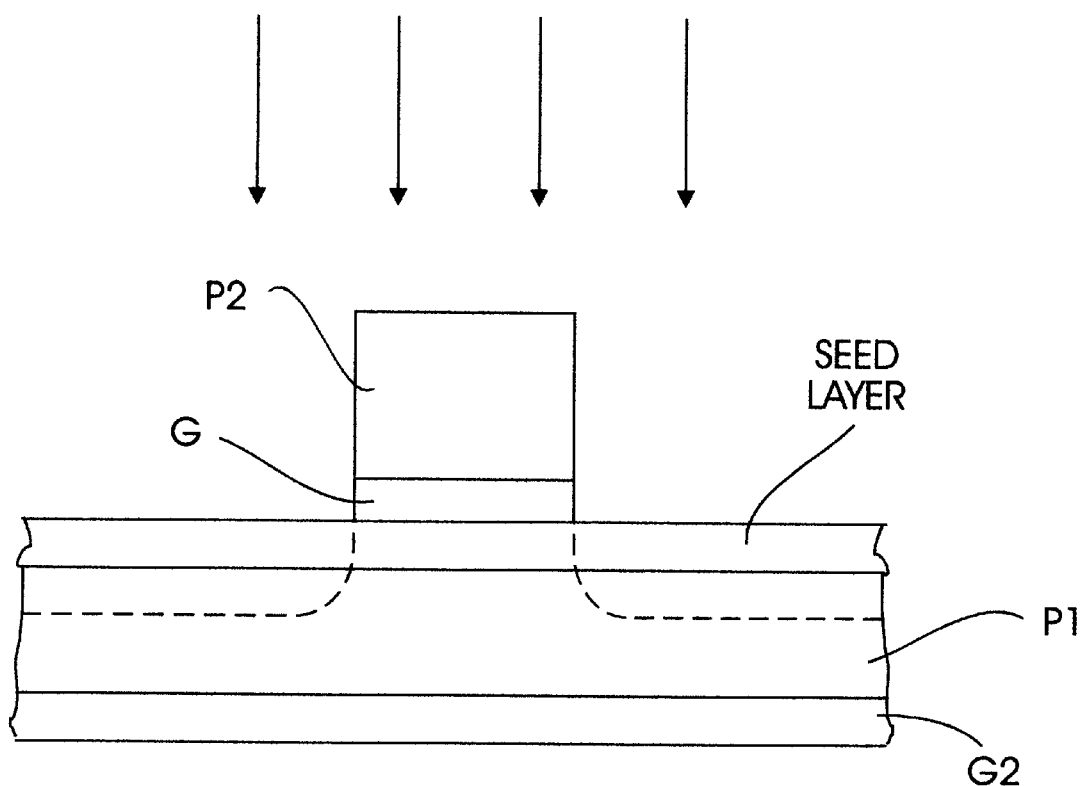

Next, the PR layer is removed and the head structure is ion beam milled, as shown by the arrows in FIG. 3K, to from the P1 pole tip with a pedestal pole tip element. The milling is done with Ar and uses the P2 layer as the mask. The milling removes the Ni—Fe seed layer and a portion of the P1 layer down to the dashed lines in FIG. 3K. Typically, the desire is to have the pedestal pole tip element P1b have a thickness approximately that of the gap G, which was deposited to a thickness of 1500 Å. Since the Ni—Fe seed layer has a thickness of 800 Å, then approximately 700 Å of P1 is removed by ion beam milling. Because the sidewalls of P2 will shadow the seed layer and the P1 layer, especially near the sidewalls, the wafer on which the head structure is fabricated is rotated during ion beam milling. Also, because some material that is milled away will redeposit on the P2 sidewalls, a sidewall cleaning step needs to be implemented. In the sidewall cleaning step, the ion beam milling angle is lowered, i.e., changed from nearly perpendicular to the substrate to approximately 70–80 degrees to the substrate.

An important advantage of the process of electroplating the gap and P2 layers onto the seed layer is that the subsequent ion beam milling does not have to remove the gap layer. Another advantage is that the seed layer is now below the gap and thus becomes a part of P1. Therefore, the P1 layer will be notched by a depth equal to the thickness of the seed layer when the seed layer removal is complete. Even considering the shadowing effect and the sidewall cleaning step during ion beam milling, the P2 thickness loss for 1500 Å of P1 notching with the plated NiP gap will be only about 0.4 microns. In contrast, if a conventional $Al_2O_3$ gap is used and the seed layer is above the gap, then the ion beam milling needs to etch through the 800 Å seed layer, the 1500 Å $Al_2O_3$ gap (which has an etch rate lower than Ni—Fe), and 1500 Å of the P1 layer. The total P2 thickness loss in the milling process would be 1.4 microns. The present invention thus allows the P2 layer to be substantially thinner and the ion beam milling process significantly shorter than would otherwise be required. A reduced P2 thickness makes the P2 fabrication process less demanding and a shorter ion beam milling time results in less thickness and trackwidth variation from wafer to wafer and head to head.

Figure 4B:
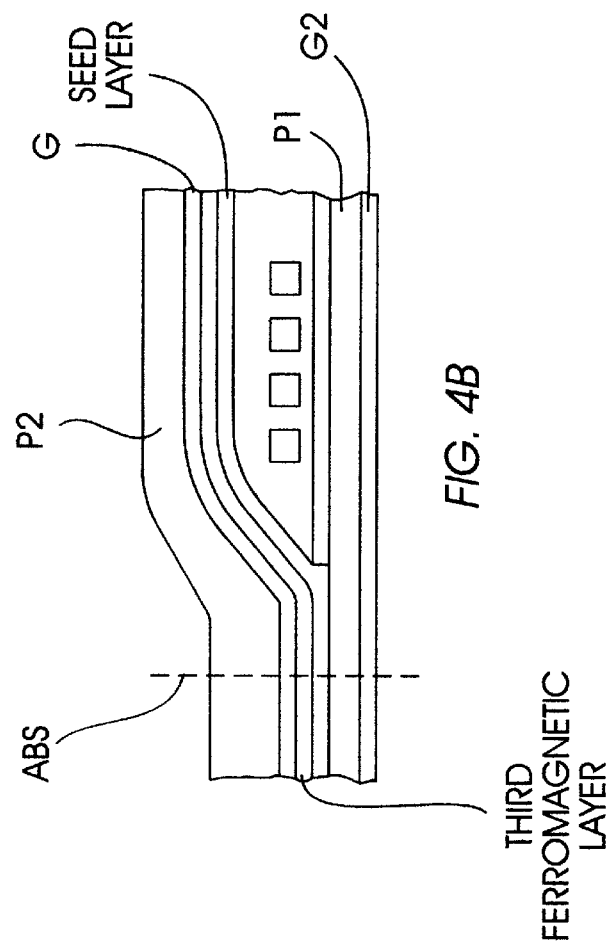
FIGS. 4A–4B are ABS sectional and center side sectional views, respectively, of a head structure with electroplated gap made according to an alternative process of the present invention.
Figure 4A:
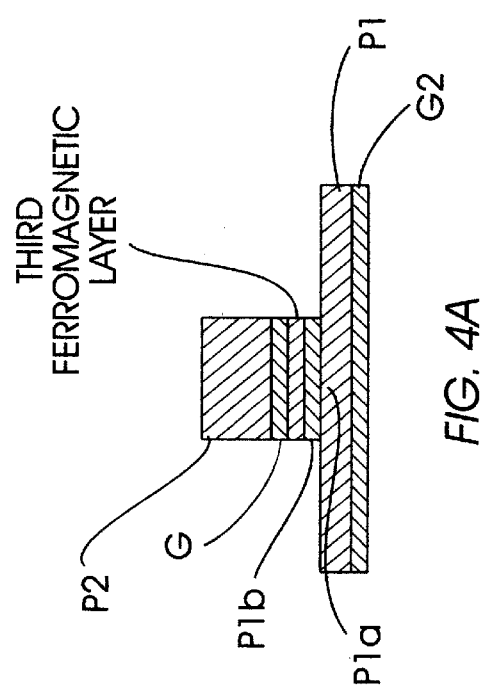

In an alternative method for forming the head, a third ferromagnetic layer of Ni—Fe is electroplated directly onto the seed layer in the regions not covered by PR before the gap layer is electroplated. This is to done to form an electroplated pedestal pole tip element P1b for the first pole piece P1. The process then proceeds as described above except that only the seed layer needs to be removed by ion beam milling. Because the element P1b has been electroplated, the milling does not have to remove a portion of the P1 layer. The resulting head is as shown in FIGS. 4A–4B. FIG. 4B shows that when this alternative method is used, the resulting pole tips and gap are all formed on a base plane that is substantially the same as the plane on which the coil structure is formed.

Figure 5B:
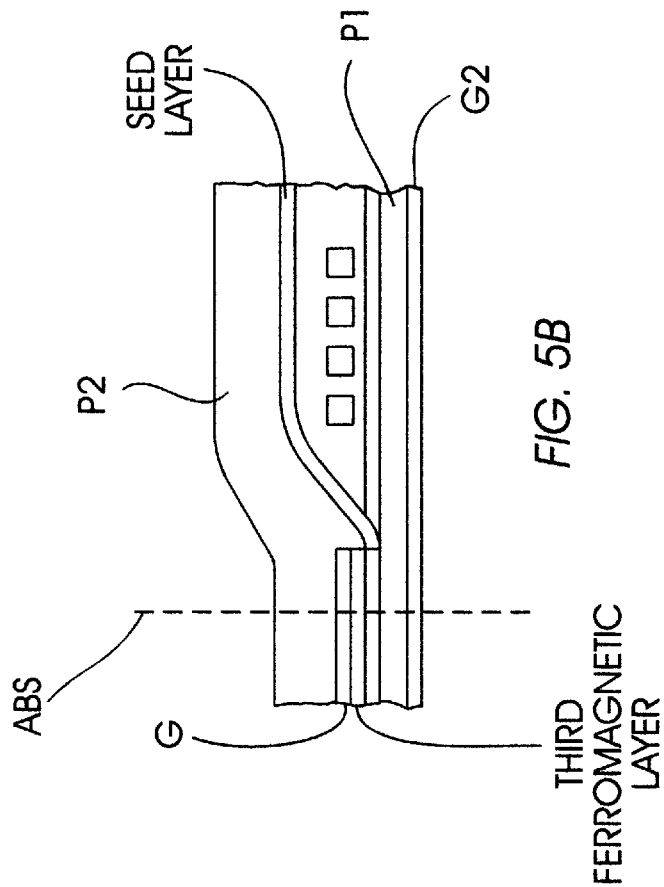
FIGS. 5A–5B are ABS sectional and center side sectional views, respectively, of a head structure with electroplated gap made according to an second alternative process of the present invention.
Figure 5A:
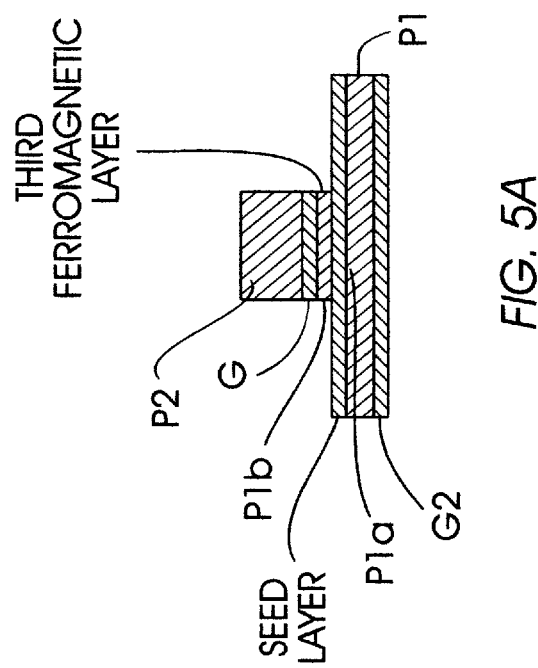

In another alternative method the photoresist patterning process is done in two phases using a double exposure and development process. The PR layer is formed over the seed layer as in the previous methods. Then a first mask is used to expose the PR only in the pole tip region. After development a first photoresist pattern then defines the region where the second pole tip is to be formed. Next a second mask is used to expose the remaining portion of the region where the second pole piece P2 is to be formed, but the photoresist is not developed. The third layer of ferromagnetic material is electroplated onto the seed layer in the region not covered by the first photoresist pattern. This forms a pedestal pole tip element of the first pole piece P1. The gap layer is then electroplated on the third ferromagnetic layer in this first photoresist region. Following the gap plating, the remaining photoresist is developed to define a second photoresist pattern in the remaining region for the second pole piece. Now the first and second photoresist patterns define an opening for electroplating the second ferromagnetic layer to form the complete second pole piece. The second ferromagnetic layer is then electroplated and the photoresist removed. The resulting head structure is as shown in FIGS. 5A–5B.

While the present invention has been particularly shown and described with reference to the preferred embodiments, it will be understood by those skilled in the art that various changes in form and detail may be made without departing from the spirit, scope, and teaching of the invention. Accordingly, the disclosed invention is to be considered merely as illustrative and limited in scope only as specified in the appended claims.

What is claimed is:

1. A method for making a thin film inductive write head having first and second pole pieces with pole tips spaced by a nonmagnetic gap and a coil structure between the first and second pole pieces, the method comprising:

providing a first layer of ferromagnetic material for the first pole piece;

forming the coil structure over the first ferromagnetic layer;

forming an electrically conductive seed layer over the first ferromagnetic layer and the coil structure;

applying a pattern of photoresist material on the seed layer for forming the second pole piece in a region of the seed layer not covered by the photoresist pattern;

electroplating a layer of nonmagnetic gap material onto the seed layer in the region not covered by the photoresist pattern;

electroplating a second layer of ferromagnetic material onto the plated nonmagnetic gap layer to form the second pole piece;

removing the photoresist material; and using the second pole piece as a mask, ion beam milling the seed layer to remove the unmasked portions of the seed layer and part of said first layer of ferromagnetic material to a predetermined depth thereby creating a pedestal pole tip as part of said first pole piece.

2. The method of claim 1 wherein providing a first layer of ferromagnetic material comprises providing a layer of Ni—Fe alloy and wherein electroplating the seed layer comprises electroplating a Ni—Fe alloy seed layer.

3. The method of claim 1 wherein the ion beam milling comprises ion beam milling to remove a portion of the first ferromagnetic layer after removal of the seed layer so as to form the first pole tip as a pedestal extending from the first ferromagnetic layer.

4. The method of claim 1 wherein electroplating a layer of nonmagnetic gap material comprises electroplating nickel-phosphorous.

5. The method of claim 1 further comprising, prior to electroplating the nonmagnetic gap material, electroplating a third layer of ferromagnetic material onto the seed layer in the region not covered by the photoresist pattern, whereby following removal of the seed layer the third ferromagnetic layer forms a pedestal pole tip element of the first pole tip.

6. The method of claim 1 wherein applying a pattern of photoresist material on the seed layer for forming the second pole piece and electroplating the nonmagnetic gap layer comprise:

applying a layer of photoresist over the seed layer;

forming from the photoresist layer a first photoresist pattern in the region where the second pole tip is to be formed;

electroplating a third layer of ferromagnetic material onto the seed layer in the region not covered by the first photoresist pattern to form a pedestal pole tip element of the first pole piece;

electroplating the gap layer onto the third ferromagnetic layer in the region not covered by the first photoresist pattern;

forming from the photoresist layer a second photoresist pattern in the region where the remaining portion of the second pole piece is to be formed; and wherein electroplating the second ferromagnetic layer comprises electroplating the second ferromagnetic layer in the regions not covered by the first and second photoresist patterns to form the second pole piece.

7. A method for making a merged magnetoresistive head having a magnetoresistive read element located between first and second magnetic shields and a thin film inductive write element having first and second pole pieces with pole tips spaced by a nonmagnetic-gap and a coil structure between the first and second pole pieces, the method comprising:

forming over the magnetoresistive element a first ferromagnetic layer of Ni—Fe alloy to serve as both the second magnetic shield for the magnetoresistive element and the layer for the first pole piece;

forming the coil structure over the first ferromagnetic layer, forming an electrically conductive Ni—Fe alloy seed layer over the first ferromagnetic layer and the coil structure;

applying a pattern of photoresist material on the seed layer for forming the second pole piece in a region of the seed layer not covered by the photoresist pattern;

electroplating a layer of nonmagnetic gap material onto the seed layer in the region not covered by the photoresist pattern;

electroplating a second layer of ferromagnetic material onto the plated nonmagnetic gap layer to form the second pole piece;

removing the photoresist material; and using the second pole piece as a mask, ion beam milling the seed layer and portion of the first ferromagnetic layer to remove the unmasked portions of the seed layer and a portion of the first ferromagnetic layer to a predetermined depth so as to form the first pole tip as a pedestal extending from the first ferromagnetic layer.

8. The method of claim 7 wherein electroplating a layer of nonmagnetic gap material comprises electroplating nickel-phosphorous.

* * * * *

UNITED STATES PATENT AND TRADEMARK OFFICE
CERTIFICATE OF CORRECTION

PATENT NO. : 5,901,432
DATED : May 11, 1999
INVENTOR(S) : Armstrong et al.

It is certified that error appears in the above-identified patent and that said Letters Patent is hereby corrected as shown below:

Column 2,
Line 9, replace "off-tracK" with -- off-track --;

Column 6,
Line 7, replace "from" with -- form --.

Signed and Sealed this

Twenty-eighth Day of May, 2002

Attest:

Attesting Officer

JAMES E. ROGAN
Director of the United States Patent and Trademark Office